United States Patent Office 2,992,149
Patented July 11, 1961

2,992,149
HEAT-SEALABLE SHEET MATERIALS
Arthur H. Drelich, Plainfield, N.J., assignor to Chicopee Manufacturing Corporation, a corporation of Massachusetts
Filed Mar. 23, 1960, Ser. No. 17,105
13 Claims. (Cl. 154—46)

The present invention relates to an inherently self-heat-sealable sheet material and more particularly to an inherently self-heat-sealable textile material wherein the potentially heat-sealable qualities are provided by the inclusion therein or deposition thereon of selected synthetic polymeric thermoplastic substances having specific properties and characteristics.

Various sheet materials, particularly in textile fabric or paper form, having self-heat-sealable properties are known to industry. For example, sheet materials such as woven fabrics, nonwoven fabrics, felts, paper, etc., have had incorporated therein or deposited thereon potentially thermoplastic or thermoadhesive substances which may be activated or rendered tacky and adhesive whereby the sheet materials may be more or less permanently adhered to themselves in folds or to other materials in a laminated structure. The methods employed in producing the desired thremoplasticity or thermoadhesivity are well known and normally have involved the application of heat and/or pressure.

Many of these potentially heat-sealable materials are of commercial applicability but have been limited to uses: (1) where the thermoplastic activation temperatures were sufficiently low that they did not affect the carrying sheet material itself; or (2) where subsequent contact with solvents or swelling agents was not anticipated; or (3) where other serve conditions were not to be encountered.

For example, certain thermoplastic substances were found to have excellent activatable adhesive and heat-sealable properties but could not be satisfactorily used inasmuch as their softening or flowing temperatures were so high that the carrying sheet material was damaged before such elevated temperatures could be reached. Or, in another instance, although the particular thermoplastic substance had a sufficiently low softening or flowing temperature that it could be used to laminate many types of materials together, it failed by delaminating upon subsequent exposure to dry cleaning solvents or to aqueous washing media at elevated temperatures. Or, in still another instance, although the softening temperatures of the heat-sealable substance was sufficiently low and it possessed resistance to dry cleaning solvents or heated aqueous media, the heat-sealable substance was unacceptable inasmuch as it did not satisfactorily adhere to the carrying sheet material or form a strong bond therewith to resist subsequent disruptive physical stresses.

It is therefore a principal purpose of the present invention to provide an inherently self-heat-sealable sheet material (1) wherein the heat-sealable substance can be activated at relatively low temperatures to avoid damage to the carrying sheet material, (2) wherein the heat-sealable substance can resist the action of heated aqueous media, organic solvents and dry cleaning agents, and (3) wherein the heat-sealable substance satisfactorily adheres to the carrying sheet materials and forms a strong bond therewith to prevent subsequent cohesive or adhesive failure.

It has been discovered that such purposes may be achieved by using as the heat-sealable substance a selected synthetic, polymeric thermoplastic polyolefin having a chemical configuration which is essentially linear in character, rather than branched-chain, and also possessing a relatively high melt index of at least about 9 and preferably at least about 13, and in some cases as high as 50 or more, as measured under conditions to be more fully described hereinafter. Additionally, it has been discovered that such purposes may be achieved by limiting the synthetic, polymeric thermoplastic polyolefins to those species having an ultimate textile strength of at least 1500 pounds per square inch, as measured under conditions to be fully described hereinafter.

The properties of synthetic, thermoplastic polyolefins are dependent to a great extent upon the chemical structure of the polymer molecule itself. Theoretically, and ideally, a polyethylene molecule, for example, comprises a long straight chain of carbon atoms, each with two hydrogen atoms attached to each carbon atom and having the classical formula $(CH_2-CH_2)_n$ wherein $n$ may range from as low as about 300 to as high as about 50,000, or even higher. During the synthesis process, however, the reactive end of a growing polyethylene molecule sometimes dislodges a hydrogen atom from the middle of another molecule, producing an active site which results in the growth of a long-chain branch or side chain at that point. In other types of side reactions, many short branches or side chains ranging up to four or more carbon atoms in length are formed at irregular intervals along the main chain and even along the longer branch chains. The resulting products are therefore actually branched-chain polyethylene polymers rather than linear polymers and have properties not particularly suitable for the present invention. In more recently developed low pressure polymerization processes leading to a relatively high density polyethylene polymer, ethylene is polymerized by means of a co-ordinating or directing mechanism whereby a straight chain, substantially unbranched molecule results. The properties of such a linear polyethylene are different and distinct from the properties of a branched-chain polyethylene. The amount and types of branching, or the lack thereof, as well as the average molecular weight have a significant effect upon the properties and characteristics of such polyethylenes. For example, and of particular importance to the present invention, a profound effect is noted on the resistance to organic solvent attack and on the thermoplastic flow characteristics of the softened or melted polyethylene. The former effect is noted by the resistance of the resulting product to dry cleaning and laundering. The latter effect can be established and evaluated by a study of the melt index properties of the polyethylene in question.

As used herein, the melt index indicates the number of grams of molten polymer which will flow through a standard orifice under standard conditions at a standard temperature and pressure in a given time. Reference is made to ASTM designation D-1238-57T for more specific details regarding the determination of such melt indices. Within the broader aspects of the present invention, a relatively high melt index of at least about 9, and preferably at least about 13 is used, such melt indices being determined by ASTM procedures described at a temperature of 250° C. and an applied load of 2160 grams.

With respect to the tensile strength of the synthetic polymeric thermoplastic polyolefins used, such values may be determined by the procedures set forth in ASTM designation D-638-58T. The minimum ultimate tensile strength of 1500 pounds per square inch is indirectly also a limitation on the maximum permissible melt index inasmuch as those polyolefins having too low a tensile strength value also have too high a melt index, since melt index is a measure of molecular weight which, in turn, controls tensile properties.

In the accompanying drawing and folowing specification, there are illustrated and described preferred embodiments of the present inventive concept but it is to be understood that the invention is not to be considered as limited to the constructions shown except as determined by the scope of the appended claims. It is also to be noted that these figures are not drawn exactly to scale but that liberties have been taken so that the invention can be defined more clearly. Referring to the accompanying drawings:

Figure 1:
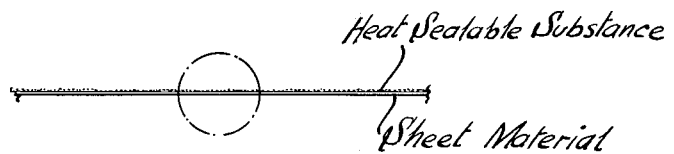
FIGURE 1 is a fragmentary, schematic view in elevation of a sheet of nonwoven fabric material upon which has been deposited granules or particles of a linear polyolefin having the desired heat-sealable properties.

With reference to FIGURE 1, there is illustrated a nonwoven fabric as the sheet material to which have been applied granules or particles of the desired heat-sealable polyolefin. Although a nonwoven fabric will be used to describe the more specific aspects of the present invention, it is to be appreciated that such is illustrative and not limitative of the present invention. Other sheet materials including woven fabrics, felts, paper, film, leather, wood, etc., are also of application to the present invention. When a nonwoven fabric is used, the weight thereof ranges from about 180 grains per square yard up to 4,000 or more grains per square yard. Other sheet materials may be correspondingly lighter or heavier, as desired or required. The nature and source of such sheet materials may be natural, man-made or synthetic and may comprise cellulosic materials such as rayon, cotton, linen, paper, wood, cellulose esters such as cellulose acetate, etc., or non-cellulosic materials such as wool, silk, polyamides, polyesters, acrylics, modacrylics, vinyls, etc.

The heat-sealable substance which is employed to provide the potentially thermoplastic properties is a substantially linear polyolefin, preferably a linear polyalphaolefin, one of the most prominent members of such a group being linear polyethylene such as made by a low pressure process with a stereospecific catalyst and (1) having a relatively high melt index of at least about 9 and preferably at least about 13 and up to about 50 or more, and (2) a relatively high or at least medium-high density of from about 0.93 to about 0.965 and preferably from about 0.94 to about 0.96, and (3) an ultimate tensile strength of at least about 1500 pounds per square inch.

Another prominent member of such a group of heat-sealable polyolefins are the isotactic, linear polypropylenes such as made by stereospecific catalytic systems. Such polypropylenes having utility for the present inventive concept have (1) relatively high melt indices of at least about 9 and preferably at least about 13 and (2) a density of from about 0.90 to about 0.92, and (3) an ultimate tensile strength of at least about 1500 pounds per square inch. It is to be appreciated that these polypropylene substances, although referred to as linear or isotactic, do not have the same precise linearity possessed by a polyethylene substance, due, of course, to the periodically disposed methyl groups extending from the main polymer chain. These extending methyl groups are, of course, necessarily present in polyolefin substances other than polyethylene and the resulting polymeric chain is nevertheless still considered linear or isotactic.

Other members of such a polyolefin group are the co-polymer resins made from mixed olefinic monomers, such as the ethylene-butylene polymers, prepared from ethylene and alpha-butylene under conditions as to produce a linear isotactic polyolefin having the desired melt index of at least 9 and preferably 13. Such polymers usually possess high densities, the majority being from about 0.94 to about 0.965.

Specific commercial examples of such polyolefins include polyethylenes, polypropylenes and polyethylene-butylenes now commercially available under trademarks such as "Marlex," sold by the Phillips Chemical Company; "Moplen," sold by Montecatini; "Grex," sold by W. R. Grace & Company; etc.

The amount of the heat-sealable polyolefin which is applied to the sheet material will vary according to the purposes and requirements involved. From about 50 to about 400 grains per square yard have been found satisfactory for practically all purposes, with from about 150 to about 350 grains per square yard being more commonly used for most purposes.

The size of the granules or particles of the thermoplastic polyolefin which are applied to the sheet material may be varied within relatively wide limits. Particles having an average diameter less than 0.84 mm. (840 microns or 0.0331 inch) capable of passing through a No. 20 U.S. Standard sieve have been found satisfactory for many purposes. Average particle diameters down to about 0.177 mm. (177 microns or 0.007 inch) capable of passing through a No. 80 U.S. Standard sieve have been found satisfactory where such smaller sizes are more desirable. Mixtures of various sizes within described limits may also be satisfactorily used.

The methods of applying the granules or particles of the thermoplastic polyolefins to the sheet material are not critical and substantially any known process of uniform distribution may be employed. For example, the granules may be sifted through screens having openings of a desired size such as slightly greater than the largest granule present. Or, if desired, the granules may be deposited from a "salt-shaker" form of apparatus wherein the sheet material passes under a vibrating container having openings in the bottom thereof to permit the passage therethrough of the granules to fall upon the sheet material passing thereunder.

After the granules have been deposited on the sheet material, passage through a heated oven takes place. The fabric processing temperatures may range from about 325° F. to about 425° F. depending upon the particular type of polyolefin present and upon the degree of thermoplasticity or adhesivity desired.

All temperatures referred to herein are the temperatures of the fabric being processed; the oven temperatures being sufficiently higher to produce the indicated fabric temperatures. In general, the upper temperature limits will be dictated by the possibility of damage to the sheet materials employed; the lower temperature limits will be dictated by the flow characteristics of the polyolefin used.

The length of the exposure of the sheet material carrying the thermoplastic polyolefin granules thereon to the above-mentioned temperatures is inversely interdependent upon the temperature used. That is to say, for higher temperatures, the exposure should be shorter, and for lower temperatures the exposure should be longer. Exposure times of from about 8 to 10 seconds or even less, to about 3 minutes, have been found satisfactory, with preferred exposures being in the lower portion of that range and extending from about 10 seconds to about 1 minute.

If desired, the sheet material may be reversed and turned upside down and additional granules deposited thereon, followed by passage through the heated oven for a second exposure. In this way, the sheet material may be faced on both sides with thermoplastic granules.

After the sheet material with the adhered granules thereon is removed from the heated oven, it may be adhered to itself in folds or pleats or it may be adhered to other sheet materials by simply being pressed with a heated iron, such as an ordinary household iron, or a heated platen, roller, mangle, etc., adjusted to the proper temperature. The temperatures of adherence or lamination are approximately in the same range mentioned hereinbefore or may be lowered to some degree due to the fact that pressure is being exerted on the granules whereby their fusion or adhesive temperatures are lowered. In general, however, it has been found that shorter time periods are required for laminating with a heated surface.

Figure 2:
FIGURE 2 is a cross-sectional view, drawn to an enlarged scale, of the sheet of nonwoven fabric material shown in FIGURE 1, showing in greater detail the granules or particles of the linear polyolefin.
Figure 3:
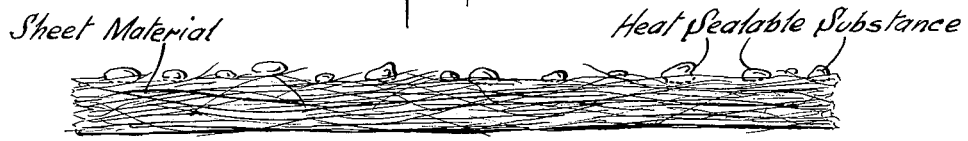
FIGURE 3 is a cross-sectional view of the same nonwoven fabric material illustrated in FIGURE 2, after an initial heat has been applied therein to soften the linear polyolefin.
Figure 4:
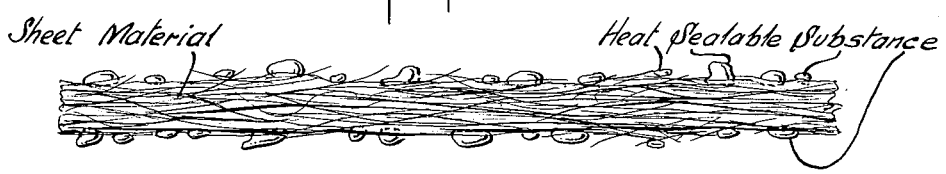
FIGURE 4 is another embodiment of the present invention in which the linear polyolefin is adhered to both sides of a nonwoven fabric sheet material.

FIGURE 2 discloses in enlarged scale the nonwoven fabric 10 and polyolefin granules 12 of FIGURE 1, prior to exposure to the elevated softening temperatures. FIGURE 3 illustrates the nonwoven fabric 10 of FIGURE 1, subsequent to exposure to the elevated softening temperatures. The rounding of the polyolefin granules 14, as a result of such temperatures, is to be noted. During softening action, the granules adhere to several fibers in the web by actually flowing and encompassing them. In FIGURE 4, the application of polyolefin granules 16 and 18 to both sides of the nonwoven fabric is illustrated.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

A two-foot-square piece (24" x 24") of an acrylic-bonded "Masslinn" nonwoven fabric comprising 100% viscose rayon fibers, 1½ denier, 1 9/16 inches staple length, and weighing about 800 grains per square yard is used as the sample sheet material. A linear polyethylene ("Grex" sold by W. R. Grace & Company) made by a low pressure process and having: a relatively high melt index of 13.6, as measured at 190° C. and 2160 grams (ASTM D–1238–57T), and considerably higher when measured at 250° C. and 2160 grams; an ultimate tensile strength of about 3900 pounds per square inch (ASTM D–638–58T); and a relatively high density of 0.95 is used as the heat-sealable thermoplastic linear polyolefin. The polyethylene is in the form of granules having a particle size such that substantially 100% by weight passes through a No. 20 U.S. Standard sieve (0.84 mm. opening); 96% by weight passes through a No. 30 U.S. Standard sieve (0.59 mm. opening); 28% by weight passes through a No. 40 U.S. Standard sieve (0.42 mm. opening); 14% by weight passes through a No. 50 U.S. Standard sieve (0.297 mm. opening); with only 4% by weight passing through a No. 80 U. S. Standard sieve (0.177 mm. opening). See FIGURES 1 and 2 of the drawing.

The polyethylene granules are sprinkled on the nonwoven fabric substantially uniformly at random in an amount equal to about 250 grains per square yard. The granule-coated nonwoven fabric is then placed in a heated oven for three minutes. The oven is maintained at a sufficiently high temperature to bring the fabric temperature to about 360° F. The polyethylene softens and adheres to the nonwoven fabric in the form of individual granules. See FIGURE 3 of the drawing.

The nonwoven fabric with the polyethylene granules adhered thereto is removed from the oven and cooled. It is then brought into contact with a two-foot-square piece (24" x 24") of 80 x 80 woven cotton cloth and pressed with a conventional household iron maintained at a temperature of about 350° F. A comfortable hand pressure is exerted on the iron during the pressing which lasts for a few seconds. The rayon nonwoven fabric and the cotton woven fabric are examined and are found to be strongly adhered to each other and to be undamaged by such heat treatments.

The laminated rayon nonwoven-cotton woven fabric is then exposed to five successive dry cleaning operations such as would be commonly encountered industrially with commercial perchloroethylene (a standard chlorinated dry cleaning agent) and no delamination is noted. Another sample of the laminated fabric is given five successive full-cycle Bendix washes at 140° F. (standard laundering temperatures) without suffering any damage or other impairment.

*Example II*

The procedures of Example I are followed substantially as set forth therein except that the linear polyethylene has: a relatively high melt index of 10, measured at 190° C. and 2160 grams (ASTM D–1238–57T) and considerably higher at 250° C. and 2160 grams; an ultimate tensile strength of about 3900 pounds per square inch; and a medium-high density of 0.95. All other conditions remain substantially as set forth in Example I. The results are comparable to those set forth therein.

*Example III*

The procedures of Example I are followed substantially as set forth therein except that the polyethylene is relatively linear; the melt index is high and is about 35, when measured at 190° C. and 2160 grams (ASTM D–1238–57T) and considerably higher when measured at 250° C. and 2160 grams, the ultimate tensile strength is about 1800 pounds per square inch, and the density is 0.928. The polyethylene granules are screened before use and all particles larger than 40 mesh are removed. All other conditions remain the same as set forth in Example I. The results are comparable.

*Examples IV and V*

The procedures of Example I are followed substantially as set forth therein except that (1) the fabric temperature is raised to 380° F. and the exposure time in the oven is reduced to 1 minute, and (2) the fabric temperature is lowered to 340° F. and the exposure time in the oven is increased to 3 minutes. Both of the resulting products are found to have the polyethylene adhered to the nonwoven fabric and to possess excellent heat-sealable properties.

*Examples VI and VII*

The procedures set forth in Example I are followed substantially as set therein except that the amount of polyethylene which is sprinkled on the nonwoven fabric (250 grains per square yard in Example 1) is (1) decreased to 150 grains per square yard, and (2) increased to 400 grains per square yard.

Both of the resulting products are found to have the polyethylene adhered to the nonwoven fabric and to possess satisfactory heat-sealable properties.

*Example VIII*

The procedures of Example I are followed substantially as set forth therein except that an isotactic polypropylene prepared by means of a stereospecific catalytic system is used as the heat-sealable polyalphaolefin. The melt index is very high and is in excess of 25, when measured at 250° C. and 2160 grams, the ultimate tensile strength is 3800 pounds per square inch, and the density is 0.91. The polypropylene is in the form of finely-divided rods obtained by cutting 15-denier polypropylene filaments (about 45 microns) into lengths less than ¼ of an inch. The polypropylene rods (10% by weight) and the viscose rayon fibers (90% by weight, ⅜" long, 1.5 denier) are mixed in water in a sheet mold, the water is drained, and a uniform mixture is obtained. After drying, the sheet is heated to 337° F. at 100 pounds per square inch (gauge) for 20 seconds. The resulting product is a relatively soft and strong, washable nonwoven fabric having heat-sealable properties. The remaining conditions are the same as set forth in Example I.

The resulting fabric possesses excellent heat-sealable properties and may be used as an interlining for outer garments and can be secured to such outer garments merely by being heated and pressed with an iron.

The fabric possesses excellent resistance to the deleterious effects of boiling water and dry cleaning agents, notably perchloroethylene.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. An inherently heat-sealable sheet material capable of resisting the deleterious effects of dry cleaning agents and water at standard laundering temperatures comprising a sheet material and, adhered thereto, heat softenable particles containing a synthetic, potentially thermoplastic, linear polyolefin plastic having a relatively high melt index of at least about 9 and an ultimate tensile strength of at least about 1500 pounds per square inch.

2. An inherently heat-sealable sheet material capable of resisting the deleterious effects of dry cleaning agents and water at standard laundering temperatures comprising a sheet material and, adhered thereto, heat softenable particles containing a synthetic, potentially thermoplastic, linear polyolefin plastic having a relatively high melt index of from about 10 to about 50.

3. An inherently heat-sealable sheet material capable of resisting the deleterious effects of dry cleaning agents and water at standard laundering temperatures comprising a sheet material and, adhered thereto, heat softenable particles containing a synthetic, potentially thermoplastic, linear polyethylene plastic having a relatively high melt index of at least about 9 and an ultimate tensile strength of at least about 1500 pounds per square inch.

4. An inherently heat-sealable sheet material capable of resisting the deleterious effects of dry cleaning agents and water at standard laundering temperatures comprising a sheet material and, adhered thereto, heat softenable particles containing a synthetic, potentially thermoplastic, isotactic polypropylene plastic having a relatively high melt index of at least about 9 and an ultimate tensile strength of at least about 1500 pounds per square inch.

5. An inherently heat-sealable fibrous sheet material capable of resisting the deleterious effects of dry cleaning agents and water at standard laundering temperatures comprising a fibrous sheet material and, adhered thereto, heat softenable particles containing a synthetic, potentially thermoplastic, linear polyolefin plastic having a relatively high melt index of at least about 9 and an ultimate tensile strength of at least about 1500 pounds per square inch.

6. An inherently heat-sealable fibrous sheet material capable of resisting the deleterious effects of dry cleaning agents and water at standard laundering temperatures comprising a fibrous sheet material and, adhered thereto, heat softenable particles containing a synthetic, potentially thermoplastic, linear polyolefin plastic having a relatively high melt index of from about 10 to about 50.

7. An inherently heat-sealable fibrous sheet material capable of resisting the deleterious effects of dry cleaning agents and water at standard laundering temperatures comprising a fibrous sheet material and, adhered thereto, heat softenable particles containing a synthetic, potentially thermoplastic, linear polyethylene plastic having a relatively high melt index of at least about 9 and an ultimate tensile strength of at least about 1500 pounds per square inch.

8. An inherently heat-sealable fibrous sheet material capable of resisting the deleterious effect of dry cleaning agents and water at standard laundering temperatures comprising a fibrous sheet material and, adhered thereto, heat softenable particles containing a synthetic, potentially thermoplastic, isotactic polypropylene plastic having a relatively high melt index of at least about 9 and an ultimate tensile strength of at least about 1500 pounds per square inch.

9. An inherently heat-sealable textile sheet material capable of resisting the deleterious effects of dry cleaning agents and water at standard laundering temperatures comprising a textile fabric and, adhered thereto, heat softenable particles containing a synthetic, potentially thermoplastic, linear polyolefin plastic having a relatively high melt index of at least about 9 and an ultimate tensile strength of at least about 1500 pounds per square inch.

10. An inherently heat-sealable textile sheet material capable of resisting the deleterious effects of dry cleaning agents and water at standard laundering temperatures comprising a woven textile fabric and, adhered thereto, heat softenable particles containing a synthetic, potentially thermoplastic, linear polyolefin plastic having a relatively high melt index of at least about 9 and an ultimate tensile strength of at least about 1500 pounds per square inch.

11. An inherently heat-sealable textile sheet material capable of resisting the deleterious effects of dry cleaning agents and water at standard laundering temperatures comprising a nonwoven textile fabric and, adhered thereto, heat softenable particles containing a synthetic, potentially thermoplastic, linear polyolefin plastic having a relatively high melt index of at least about 9 and an ultimate tensile strength of at least about 1500 pounds per square inch.

12. A laminated structure comprising a base sheet material and adhered thereto an inherently heat-sealable sheet material, said base sheet material and said inherently self-sealable sheet material being adhered by means of heat softenable particles containing a synthetic, potentially thermoplastic, linear polyolefin plastic, having a relatively high melt index of at least about 9 and an ultimate tensile strength of at least about 1500 pounds per square inch, whereby said laminated structure is capable of resisting the deleterious delaminating effects of dry cleaning agents and water at standard laundering temperatures.

13. A laminated structure comprising a base sheet material and adhered thereto an inherently heat-sealable sheet material, said base material and said inherently self-sealable sheet material being adehred by means of heat softenable particles containing a synthetic, potentially thermoplastic, linear polyolefin plastic having a relatively high melt index of from about 10 to about 50, whereby said laminated structure is capable of resisting the deleterious delaminating effects of dry cleaning agents and water at standard laundering temperatures.

References Cited in the file of this patent

UNITED STATES PATENTS

| | | |
|---|---|---|
| 2,603,575 | Schramm | July 15, 1952 |
| 2,732,324 | Morris | Jan. 24, 1956 |
| 2,824,090 | Edwards | Feb. 18, 1958 |
| 2,867,241 | Harris | Jan. 6, 1959 |
| 2,932,323 | Aries | Apr. 12, 1960 |

FOREIGN PATENTS

| | | |
|---|---|---|
| 556,813 | Great Britain | Oct. 22, 1943 |

OTHER REFERENCES

Applied Plastics, vol. 2, No. 4, April 1959 (page 16 relied on).

Modern Plastics Encyclopedia Issue for 1959 (page 139 relied on).